United States Patent
Liou et al.

(10) Patent No.: US 7,553,034 B1
(45) Date of Patent: Jun. 30, 2009

(54) DISPLAY HAVING A VISOR

(75) Inventors: Guan-De Liou, Taipei (TW); Stephen Tsai, Sijhih (TW); Li-Li Lai, Taipei (TW)

(73) Assignee: Hannspree, Inc. (TW)

( * ) Notice: Subject to any disclaimer, the term of this patent is extended or adjusted under 35 U.S.C. 154(b) by 20 days.

(21) Appl. No.: 12/071,953

(22) Filed: Feb. 28, 2008

(30) Foreign Application Priority Data

Dec. 19, 2007 (TW) .............................. 96148696 A

(51) Int. Cl.
 *G02B 27/00* (2006.01)
(52) U.S. Cl. ..................... 359/601; 359/609; 359/612
(58) Field of Classification Search ......... 359/601–614, 359/819
See application file for complete search history.

(56) References Cited

U.S. PATENT DOCUMENTS 4,759,621 A * 7/1988 Hawkins ..................... 359/862
4,863,242 A * 9/1989 Correa ........................ 359/601
5,200,859 A * 4/1993 Payner et al. ............... 359/857
5,448,405 A * 9/1995 Clausen et al. .............. 359/601

* cited by examiner

*Primary Examiner*—Thong Nguyen
(74) *Attorney, Agent, or Firm*—Bacon & Thomas, PLLC

(57) ABSTRACT

The present invention is to provide a display having a visor, which comprises a flat display, two sliding members, two spinning arms and a visor. A sliding slot is disposed at each of two corresponding sides of a screen of the flat display respectively, wherein the sliding members are installed in the sliding slots and movable along the sliding slots. One end of each of the spinning arms is pivotally coupled to the corresponding sliding member respectively, and the other ends of the spinning arms hold the visor by both sides which enable the visor to be spun on the top of the flat display and to be moved on the top of the flat display along the sliding slots for preventing the screen from glare and light reflection and protecting the screen from being scratched or dust.

6 Claims, 4 Drawing Sheets

DISPLAY HAVING A VISOR

FIELD OF THE INVENTION

The present invention relates to a display, and more particularly to a display having a visor, enabling user to adjust the visor depending on actual situation for preventing glare and light reflection from the screen of the display and also protecting the screen of the display from being damaged.

BACKGROUND OF THE INVENTION

Due to the rapid progress of the photoelectric industry and the following advancement of LCD panel manufacturing technology, the prices of products equipped with LCD panel are more and more acceptable under mass production. Application of LCD panel to all kinds of flat display or television has become an important trend nowadays. To fulfill diverse needs of the users, the manufacturers have put their efforts in improving the appearance and functionality of the flat display to make them with better quality and more affordable to replace the conventional bulky and heavy cathode ray tube (CRT) display. Comparing with conventional CRT displays, the flat display is much thinner and lighter, easy for the user to move from places to places such as the bathroom, kitchen, garden or other suitable places, allows the user to watch videos, TV programs, play video games provided for personal pleasure and receive the latest information from most of the places over the world.

The flat display is slim, light-weighted and easy to move, thus changes customer usage greatly. For example, the flat display with special and attractive appearance may be mounted on the wall as a decoration or moved to the balcony for viewing pleasure while having an afternoon tea. All such usage will lead to light reflection caused by the lighting from the surroundings, the screen being damaged or scratched during moving, or dust from the surroundings being accumulated on the screen thus results in severe interference to visual display. To solve the problems stated above, some manufacturers have adopted the method of adding a transparent protector to the flat display. Please referring to FIG. 1, taking a display 1 in market for example, the display 1 comprises a flat display 11, a transparent protector 13 and a restraint member 131 which is disposed on the upper end of the transparent protector 13 and with its one end coupled to the upper end of the transparent protector 13 to make sure that the transparent protector 13 is placed right in front of a screen 12 of the flat display 11 thus protects the screen 12 from scratches and dust. However, there are still various shortcomings of the above conventional display 1 and transparent protector 13 as follows.

1. Please refer to FIG. 1, the transparent protector 13 and the flat display 11 are purchased and used separately that the transparent protector 13 is repeatedly fixed to the flat display 11 through the restraint member 131 and removed while it is not in use which may cause damage to the restraint member 131 or the surface of the flat display 11.
2. Please refer to FIG. 1, due to the transparent protector 13 and the flat display 11 are separate components, the transparent protector 13 needs to be stored with extra case or bag when removed from the flat display 11 to prevent it from accidental damage.
3. Please refer to FIG. 1, the flat display 11 is vulnerable to lighting in the surroundings that unpleasant interference like glare and light reflection might occurred on the screen 12 of the display 1 when it is in use thus results in great disturbance.

Hence, developing a novel display having a visor to improve the conventional display and transparent protector and solve the problems of repeat installation and removal and unpleasant interference like light reflection caused by the surroundings thus makes it more convenient for users has become an important issue for display designers and manufacturers.

SUMMARY OF THE INVENTION

For the purpose of improving the conventional display and transparent protector, after hard work of research and experiments for a long time, the inventor has developed a display having a visor of the present invention that effectively solve the problems stated above.

One of the objectives of the present invention is to provide a display having a visor which comprises a flat display (such as a LCD), two sliding members, two spinning arms and a visor. A sliding slot is disposed at each of two corresponding sides of the flat display near a screen respectively wherein the sliding members are installed in the sliding slots and may be moved along the sliding slots. One end of each of the spinning arms is pivotally coupled to the corresponding sliding member respectively, and together the other ends of the spinning arms hold the visor by both sides which enable the visor to be spun on the top of the flat display with the joints of each spinning arms and its corresponding sliding member as pivots and to be moved on the top of the flat display along the sliding slots. In the case that the visor is spun to the top of the screen of the flat display, it becomes a visor which blocks the strong lighting and prevents light reflection, and while the visor is spun to the front of the screen, it provides protection for the screen and prevents dust and scratches.

Another objective of the present invention is to provide a display having a visor wherein the visor is held by two holding parts which are formed by two spinning arms disposed on the flat display respectively thus enables the angle of the visor to be adjusted according to the lighting. Whether staying outside or in places with strong lighting, a user may adjust the angle and position of the visor depending on actual situation to prevent from glare and save the expense for an extra visor as well.

Another objective of the present invention is to provide a display having a visor wherein at least a thin-film solar panel is disposed on the visor facing the source of light for photoelectric transformation while the visor is positioned to block the light or glare thus allows the cell to be charged and maintains power supply.

BRIEF DESCRIPTION OF THE DRAWINGS

The foregoing aspects, as well as many of the attendant advantages and features of the present invention will become more apparent by reference to the following detailed description, when taken in conjunction with the accompanying drawings, wherein.

DETAILED DESCRIPTION OF THE PREFERRED EMBODIMENT

Figure 1:
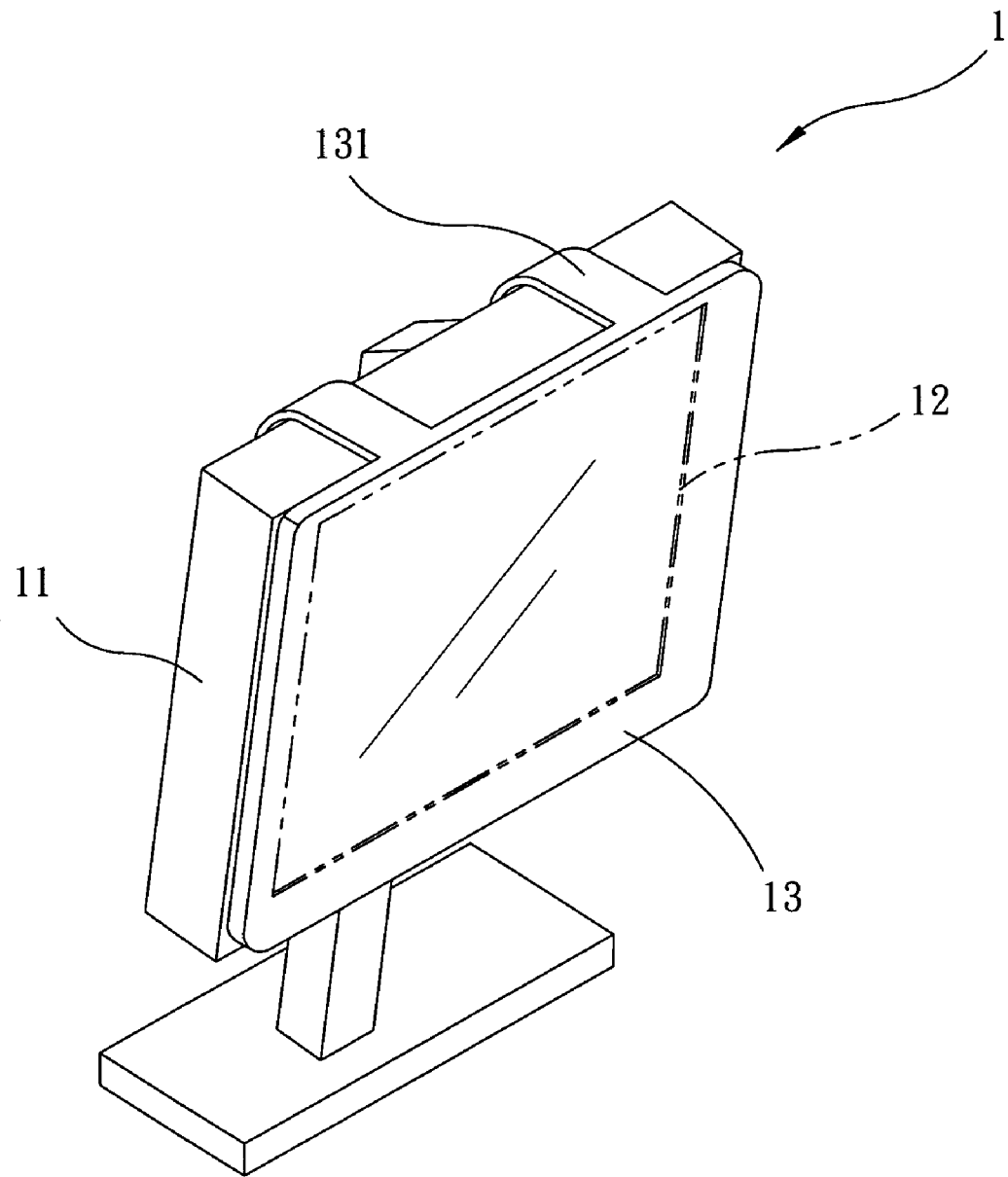
FIG. 1 shows the perspective view of a conventional display and a protector.
Figure 2:
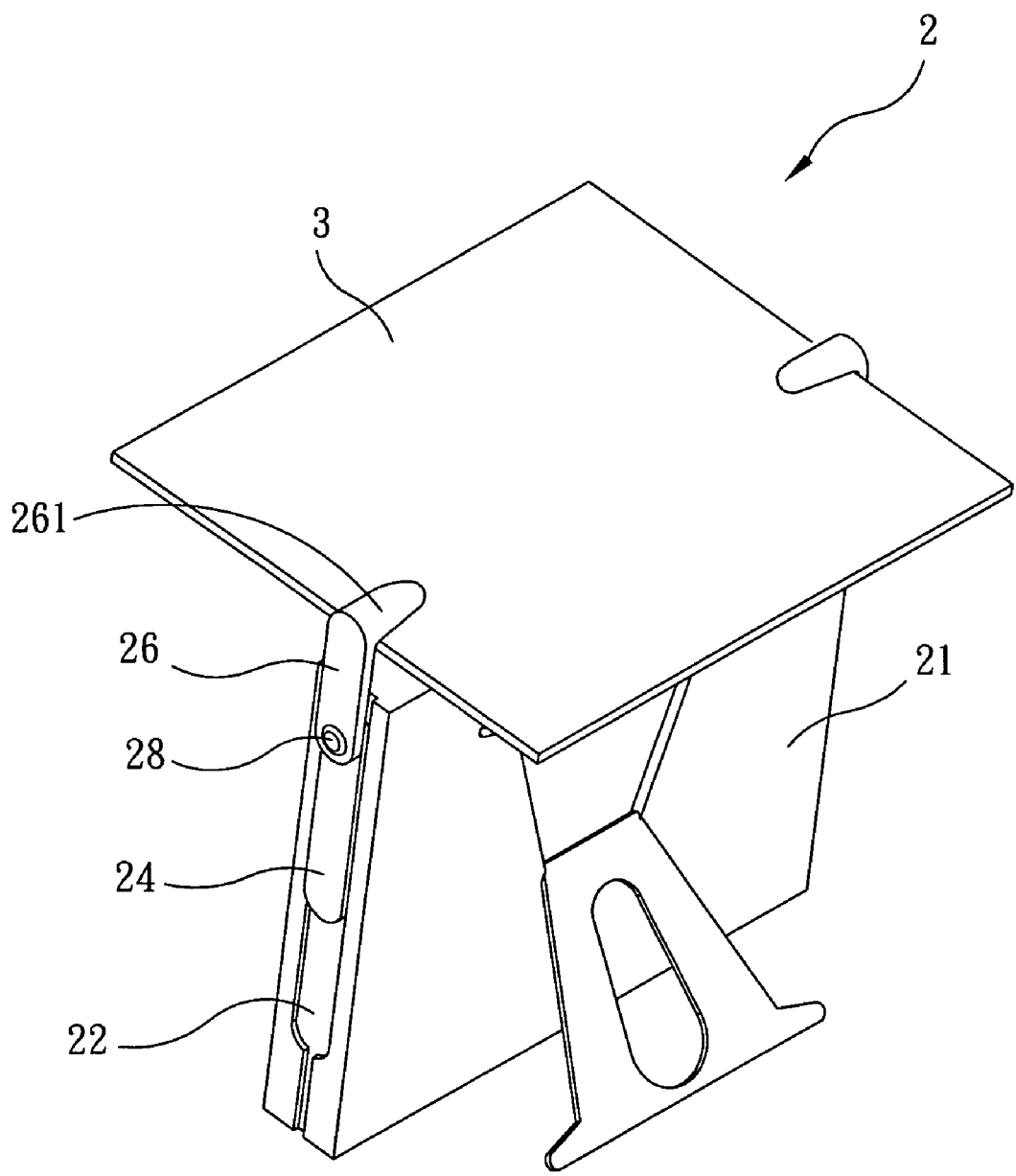
FIG. 2 shows the perspective view of a display having a visor according to a preferred embodiment of the present invention.

Please referring to FIG. 2, the present invention is a display 2 having a visor 3 which provides protection for the screen and also blocks glare and light reflection. The display 2 having a visor 3 comprises at least one sliding member 24, a spinning arm 26, and a flat display 21 (such as a LCD). The visor 3 may be transparent, half-transparent or opaque and may be made of plastic material like polyethylene or polypropylene or metal to prevent the visor 3 from being damaged due to external force. In this preferred embodiment, a sliding slot 22 is disposed at each of the two sides of the flat display 21 respectively that each of the sliding member 24 is installed in corresponding sliding slot 22 and may be moved along its corresponding sliding slot 22. A pivot 28 is disposed on each of the sliding members 24 respectively for pivotal connection between one end of each of the spinning arms 26 and the corresponding sliding member 24. A holding part 261 is formed at the other end of each of the spinning arms 26 to hold the visor 3 by both sides thus enable the visor 3 to be spun on the top of the flat display 21 with the joints of each spinning arms 26 and its corresponding sliding member 24 as pivots and to be moved on the top of the flat display 21 along the sliding slots 22.

In the case that the visor 3 is spun to the top of the screen of the flat display 21, it becomes a visor 3 which blocks the strong lighting and prevents light reflection, and when the visor 3 is spun to the front of the screen, it provides protection for the screen and prevents dust and scratches.

Figure 3:
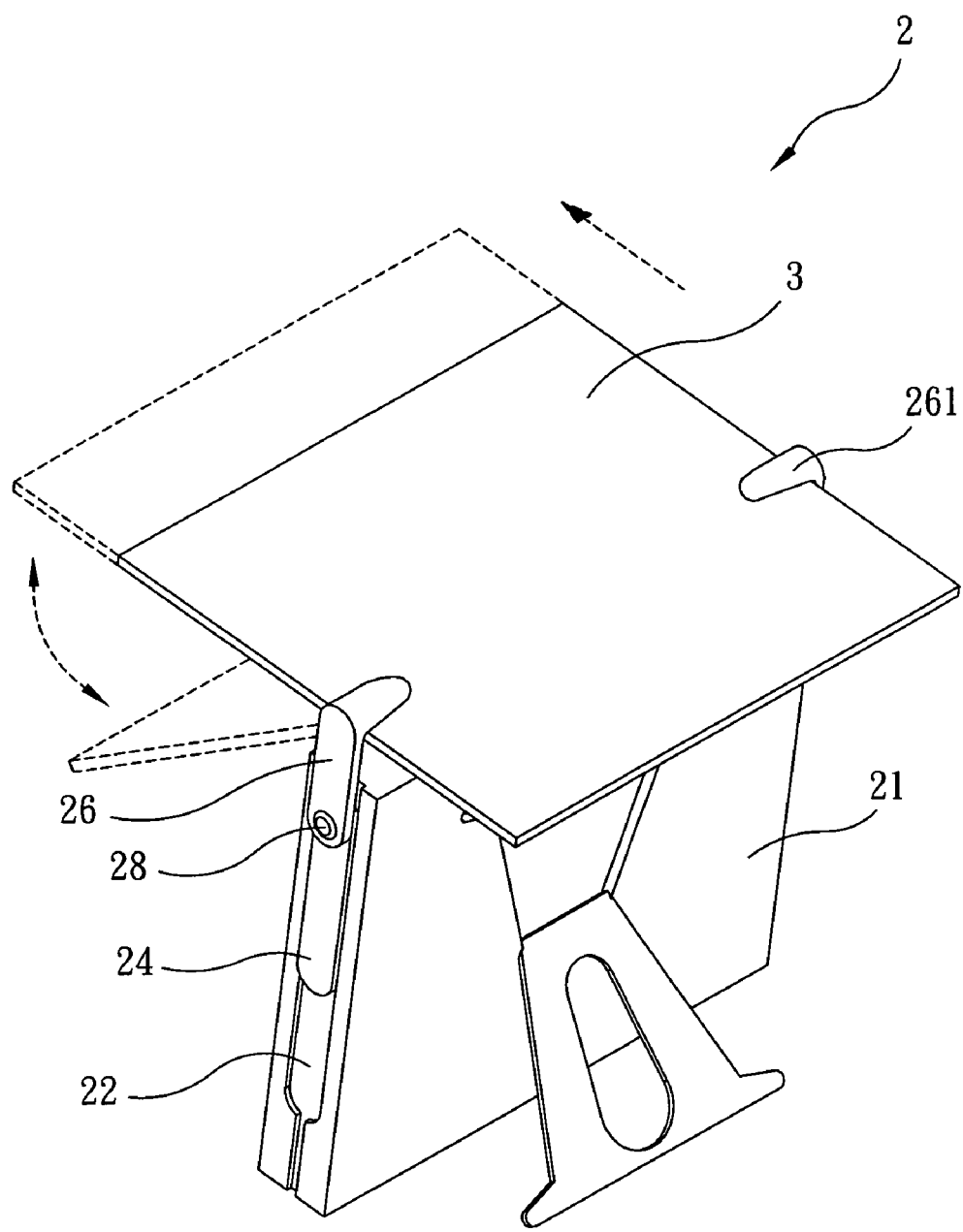
FIG. 3 shows the movements of the display having a visor according to the preferred embodiment of the present invention.

Please referring to FIG. 3, the display 2 having a visor 3 of the present invention in use is shown. A sliding slot 22 is disposed at each of the two sides of the flat display 21 respectively that a sliding member 24 is installed in each of the sliding slots 22 respectively and may be moved along its corresponding sliding slot 22. A pivot 28 is disposed at one end of each of the sliding members 24 for pivotal connection with its corresponding spinning arm 26 wherein a holding part 261 is formed on each of the spinning arms 26 for holding the visor 3 and making an extension or contraction as well. In the case that protection of the flat display 21 is desired, the spinning arms 26 may be spun with a wide angle using the pivots 28 wherein the sliding members 24 are located in the sliding slots 22 entirely and the visor 3 held by the spinning arms 26 is located in front of the flat display 21.

Please referring to FIG. 3, in said embodiment, in the case that the flat display 21 is used under strong lighting, the sliding members 24 disposed at its both sides may be moved along the sliding slots 22, and the spinning arms 26 coupled to the sliding members 24 using the pivots 28 may be spun when the sliding members 24 are moved to the other ends thus the angle and position of the visor 3 held by the holding part 261 may be adjusted according to actual needs.

As above, the sliding members 24 and spinning arms 26 not only facilitate protection for the flat display 21 and blocking of strong lighting but also provide easy usage and storage.

Figure 4:
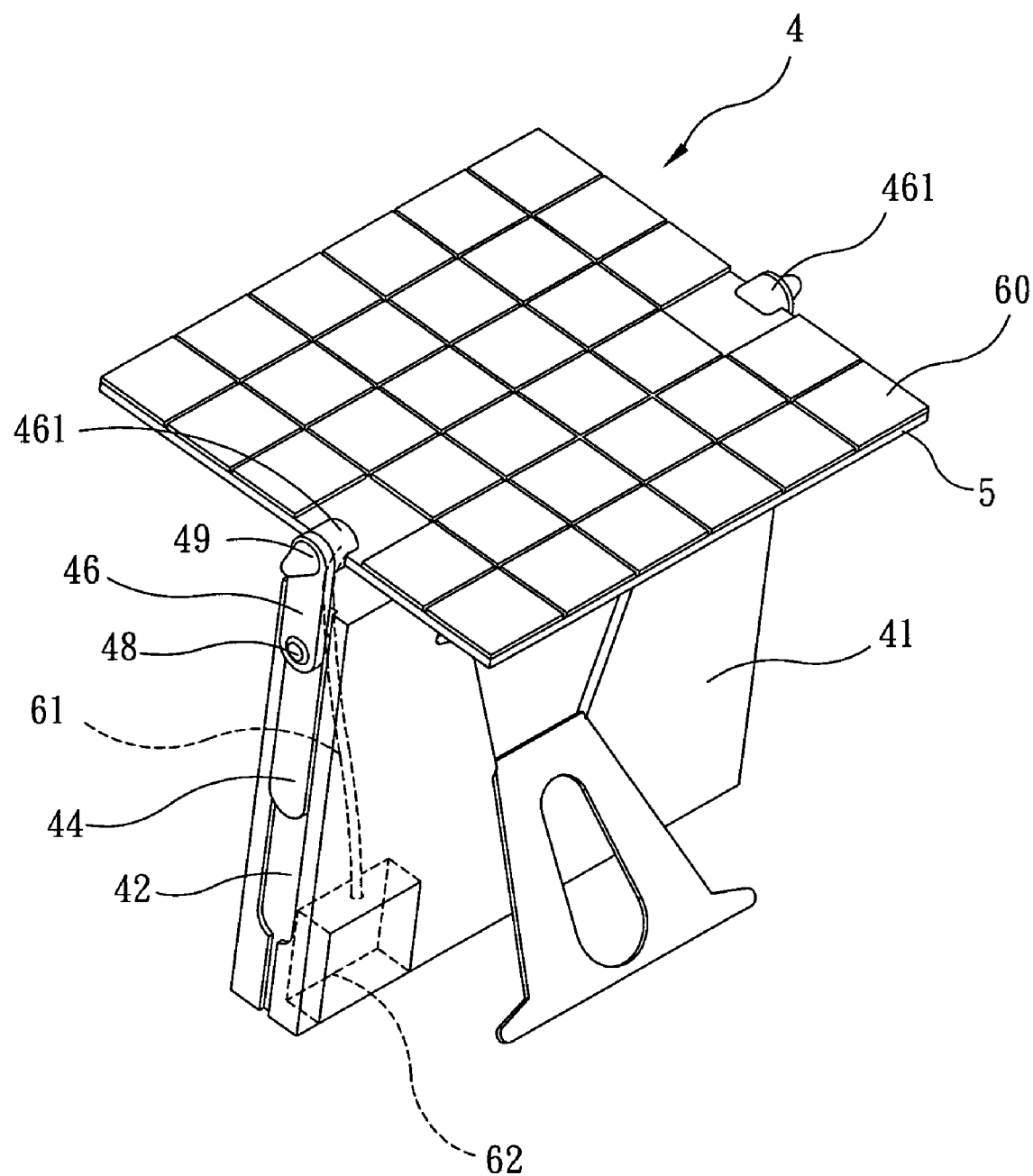
FIG. 4 shows the perspective view of a display having a visor according to another preferred embodiment of the present invention.

Please referring to FIG. 4, in a second embodiment of a display 4 having a visor 5 of the present invention, a sliding slot 42 is disposed at each of the two sides of a flat display 41 respectively that a sliding member 44 is installed in each of the sliding slots 42 respectively and may be moved along its corresponding sliding slot 42. A pivot 48 is disposed at one end of each of the sliding members 44 for pivotal connection with corresponding spinning arm 46 wherein a holding part 461 and a knob 49 are disposed on each of the spinning arms 46 that the holding part 461 is for holding a visor 5 and extension and contraction as well while the knob 49 is for two-stage angle adjustment. In the case that the visor 5 is used to block the lighting, a thin-film solar panel 60 may be deployed on the visor 5 facing the source of light and the flat display 41 may be equipped with a secondary cell 62. When the visor 5 is spun to the top of the flat display 41, the thin-film solar panel 60 may perform photoelectric transformation and the electricity acquired may be stored in the secondary cell 62 through a transmission wire 61 for later use when the flat display 41 is out of power.

While the invention herein disclosed has been described by means of specific embodiments, numerous modifications and variations could be made thereto by those skilled in the art without departing from the scope and spirit of the invention set forth in the claims.

What is claimed is:

1. A display having a visor, comprising:
   a visor;
   a flat display including a screen, wherein a sliding slot is disposed at each of two corresponding sides of said flat display near the screen respectively;
   two sliding members installed in said sliding slots respectively that are moved along said sliding slots; and
   two spinning arms, wherein one end of each of said spinning arms is pivotally coupled to the corresponding sliding member respectively, and together the other ends of said spinning arms hold said visor by both sides thus enable said visor to be spun with one end of each of said spinning arms as pivots that said visor is spun to the top of said screen to block light and glare or be spun to the front of said screen for protecting the screen.

2. A display having a visor of claim 1, wherein said visor is made of plastic material or metal.

3. A display having a visor of claim 2, wherein said plastic material is polyethylene or polypropylene.

4. A display having a visor of claim 2, wherein a solar panel is disposed on said visor.

5. A display having a visor of claim 4, wherein said solar panel is a thin-film solar panel.

6. A display having a visor of claim 1, wherein a holding part for holding said visor is formed on each of said spinning arms respectively.

* * * * *